UNITED STATES PATENT OFFICE.

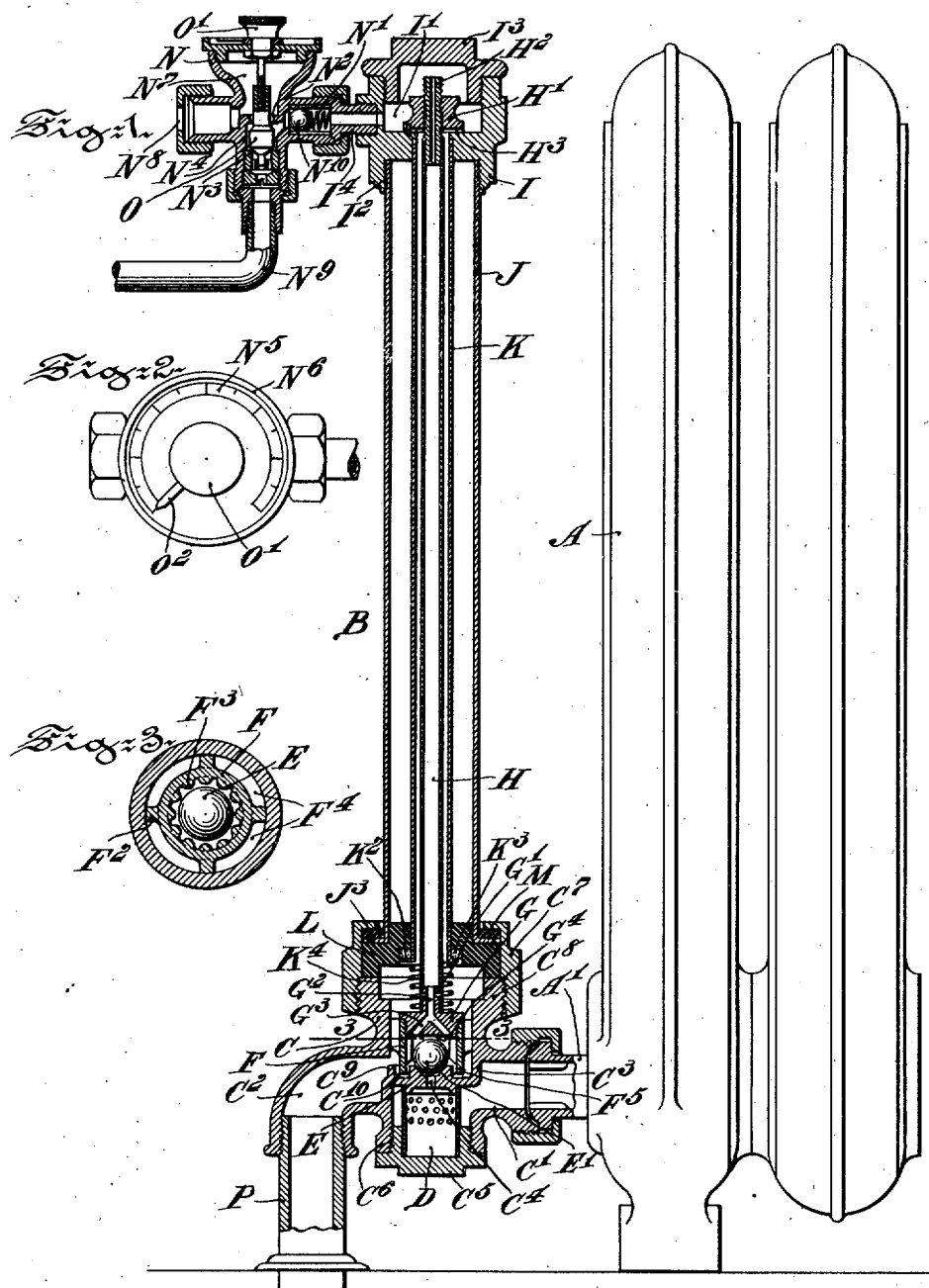

HARRY C. MALLORY, OF NEW YORK, N. Y.

HEATING APPARATUS.

988,726.

Specification of Letters Patent.

Patented Apr. 4, 1911.

Application filed June 27, 1907, Serial No. 380,995. Renewed July 26, 1910. Serial No. 573,843.

*To all whom it may concern:*

Be it known that I, HARRY C. MALLORY, a citizen of the United States of America, residing in the city, county, and State of New York, have invented a certain new and useful Improvement in Heating Apparatus, of which the following is a true and exact description, reference being had to the accompanying drawings, which form a part thereof.

My present invention relates to means for regulating the heat radiating capacity of a heating device and is designed for use in a heating system in which the flow of heating fluid to the heat radiating device or radiator is controlled by a valve actuated by thermostatic mechanism, which is warmed by the heat derived from the heating fluid and cooled by a stream of fluid thermal agent, such as air. The thermostatic mechanism is arranged to open the valve controlling the flow of the heating fluid when it contracts and to close the valve when it expands.

One object of the present invention is the provision of means for varying the temperature of the stream of fluid thermal agent acting on the thermostatic mechanism, thereby varying the action of the latter in accordance with the conditions of service; and another object is to improve the construction and operation of the controlling valve and actuating mechanism therefor.

Numerous novel features of construction and arrangement disclosed but not claimed herein, are disclosed and claimed in my pending application Serial No. 356,318, filed 8th February, 1907. The features of novelty which it is intended to cover in this application are pointed out with particularity in the claims annexed to and forming a part of this application.

For a better understanding of my invention, however, and the advantages possessed by it, reference may be had to the accompanying drawings and descriptive matter in which I have illustrated and described one of the forms in which my invention may be embodied.

Of the drawings, Figure 1 is an elevation, partly in section, of a portion of a steam radiator and the mechanism for controlling the flow of the heating fluid therethrough. Fig. 2 is a plan view of the regulator for controlling the flow of the stream of air which passes by and acts thermally on the thermostatic mechanism for actuating the controlling valve proper; and, Fig. 3 is a section taken on the line 3—3 of Fig. 1.

In the drawings, I have shown the invention embodied in steam heating apparatus, though it should be understood that the invention claimed herein is in many respects as well adapted for use in hot water heating systems as in those in which steam is employed as the heating agent. In the construction shown, steam is supplied to the radiator A, preferably at the top, by connections not shown in the drawing. The heating fluid escapes from the radiator through the coupling $A^1$, which is connected to the inlet chamber $C^1$ of a valve casing C. The outlet chamber $C^2$ of the valve casing is connected to a pipe P in which a low pressure or vacuum is maintained by suitable means not shown in the drawings. The inlet and outlet chambers of the valve casing are separated by a diaphragm $C^3$ having a port $C^4$ extending through it. It will be seen that the lower end of the port $C^4$ communicates with the inlet chamber $C^1$, and the upper end of the port communicates with the outlet chamber $C^2$. A cap $C^5$ screwed into an opening $C^6$ in the valve casing below and concentric with the port $C^4$ supports a tubular cage or screen D which extends between the cap and the end wall of the diaphragm $C^3$. The screen D serves to prevent large particles of dirt or other foreign matter from passing into the interior of the screen. The major portion of the particles of dirt or other foreign matter small enough to pass through the screen D collects in the cap $C^5$ and may be removed from time to time without disturbing the adjustment of the valve parts by the simple removal of the cap $C^5$.

The port $C^4$ is controlled by a ball valve E adapted to seat itself on a seat $E^1$ formed on the upper side of the diaphragm $C^3$. The ball valve is surrounded by a tubular member or shell F screwed on to the enlarged end of a plug G, the smaller end $G^1$ of which is screwed into the lower end of a hollow member H. The members F and G thus form in effect extensions of the member H which is the thermally expansible member of the valve.

The tubular member F is provided with axially extending ribs $F^2$ and $F^3$ formed on its outer and inner surfaces respectively. The ribs F² serve to properly guide the member F in the valve casing while providing passages F⁴. Similarly, the ribs F³ form guides for preventing undue displacement of the ball valve while at the same time insuring free passages for air and steam through the member F at the side of the ball. Ports G² and G³ in the member G lead from the interior of the hollow member H to the interior of the tubular member F. As shown, the ports G³ are arranged so that the bottom surface G⁴ of the member G immediately above the ball valve is unbroken.

The upper end of the rod H is supported by means of a nut H¹ screwed on threaded upper end of the rod H, or rather on a hollow extension H² thereof. The nut is provided with ribs H³ on its under side, which bear against the bottom wall of a recess or chamber I¹ formed in a casing or cap member I, the latter being supported by a tube J surrounding the tube H. The tube J, which is threaded into the member I at I² and is made of some material having a relatively low co-efficient of thermal expansion, is provided at its lower end with an outturned flange J³, which rests on and is supported by a bushing or washer L, preferably made of some material such as compressed fiber compound, having poor heat conductivity. A washer M, which may be of the same material as the member L, surrounds the tube J and bears against the flange J³, the parts being secured together by a cap member C⁷ screwed on to the threaded extension C⁸ of the valve casing. By this arrangement the tube J is rigidly secured to the valve casing while at the same time it is maintained in a poor heat conducting relation to the metallic parts thereof. The tube K, which is spaced away from the inner tube H which is surrounds and from the tube J which surrounds it, is secured in an opening formed in the bottom wall of the member I and is open to the chamber I¹ through the channels formed between the bottom wall of the chamber I¹, the bottom of the nut H¹, and the ribs H³. The lower end of the tube K extends through the member L, and is provided with an outturned flanged portion K², the upper side of which serves to hold in place a packing K³, and the lower side of which forms a seat for a spring K⁴, which extends between it and the upper end of the enlarged portion of the member G. The tube K and chamber I¹ thus form extensions of the outlet chamber of the valve in which member H is located.

The upper end of the chamber I¹ in the member I is closed by a cap, I³. The chamber I¹ is connected to the outlet port N¹ of the regulator valve casing N by a coupling I⁴. The valve casing N is provided with an intermediate chamber N⁴ having an upper port N², and a lower port N³. The ports N² and N³ are controlled by a double seated non-rotatable valve O threaded on and moved in the direction of its length by a rotatable member O¹. The parts are so arranged that a movement of the valve in the direction to throttle or close the port N² opens the port N³, and a movement of the valve in the direction to throttle or close the port N³ opens the port N². A dial N⁵ on the cap member N⁶ in connection with a pointer O² carried by the operating member O¹ shows the position of the valve O relative to the ports N² and N³. The port N² leads to the chamber N⁴ from a chamber N⁷ which is in connection with a source of relatively warm air, as through the port N⁸, with the air of the apartment heated. The port N³ admits relatively cold air drawn through a conduit N⁹ to the chamber N⁴. The conduit N⁹ may draw air from the outside atmosphere. A non-return valve N¹⁰ prevents air, steam or water from flowing from chamber I¹ into chamber N⁴.

In the particular form of the heating system shown, regulation of the heat radiating capacity of the radiator A is intended to be governed by the accumulation of water of condensation in the radiator. In operation, air is caused to flow from the chamber N⁴ of the regulator casing into the chamber I¹, and down through the bore of the member H and the space between the member H and the member K into the escape pipe P by reason of the difference between the pressure of the atmosphere and that in the low pressure escape pipe. The air passing along the tube H tends to cool and contract the latter and thereby lift its lower end into the position of Fig. 1, so that the valve E is free to lift from its seat and allow the accumulated water of condensation to escape from the radiator. A subsequent increase in the temperature of the rod H produced in normal operation by the increased temperature due to the increased radiating capacity of the radiator as steam takes the place of water of condensation causes the rod to expand and close the valve E. Should the increase in temperature of the rod H thus produced be insufficient to cause it to close the valve until all the water of condensation in the radiator has escaped, steam will then begin to pass through the port C⁴. This steam will immediately fill the interior of the tube H, being guided into it by the shell member F. As soon as the member H is exposed to the steam it expands and closes the valve.

With the arrangement shown the steam which passes up through the member H returns through the member K along the outer surface of the member H, thus rapidly heating the latter. In the form of my invention shown in the drawings, the lower edge F⁹ of the member F extends below the upper surface of the valve seat E¹, so that the steam passing through the port C⁴ will be more effectively guided into the bore of the member H. For this purpose also, a rib C⁹ is provided which forms an annular pocket C¹⁰ about the valve seat into which the edge F⁸ extends. This pocket is normally filled with water which forms a seal which with the low pressures employed is effective in guiding the steam into the member H. Where it is desired that the cooling stream of air may pass through the member H this pocket may be dispensed with. The member H is protected from heat radiated from the tube J by the tube K and the space between the tubes J and K, which may be filled with air or with some material which is a poor conductor of heat.

An undue expansion of the member H is prevented from causing the latter to buckle by the arrangement shown by which the nut H¹ is free to lift from the seat normally operating it. The cooling effect of the air passing along the member H is readily and positively varied by the manipulation of the valve O, by means of which any desired admixture of the cold air drawn from the exterior atmosphere through the conduit N⁹ and from the room through the port N⁸ can be obtained. It will be understood that by supplying air from the exterior atmosphere an automatic regulation is obtained, since the colder external atmosphere, and consequently the greater the heat radiating capacity desired, the more rapidly the member H will be cooled and the sooner the valve E will open.

By arranging the expansible part or parts of the thermostatic mechanism out of the normal path of the water of condensation and providing means for causing steam issuing from the outlet passage of the radiator to flow along a considerable extent of said expansible part or parts I am able with relatively simple and effective thermostatic mechanism to obtain a more rapid closure of the valve controlling the flow of the heating fluid through the radiator when steam begins to issue from the outlet passage of the radiator than is possible with some constructions heretofore used, in which the expansible parts of the thermostatic mechanism are located in a chamber which merely fills with steam and in which no provision is made for causing the steam to flow along a considerable extent of the expansible part or parts of the thermostatic mechanism.

An advantageous feature of the construction shown arises from the fact that the ball valve E serves independently of the expansible rod H as a simple and effectual check valve to prevent back flow from the conduit P into the radiator when the conditions of use tend to cause such a flow into a particular radiator as where there are a number of radiators in a single heating system and a high vacuum occurs in a particular radiator because of the condensation therein occurring when the flow of steam to that radiator is cut off at its steam inlet end.

Having now described my invention, what I claim as new and desire to secure by Letters Patent is:

1. In a heating system, a radiator, a valve for controlling the flow of the heating fluid therethrough, thermostatic actuating mechanism for the valve, means for acting on said mechanism with a stream of air of varying temperature, said means including a connection for supplying air drawn from the external atmosphere, a connection for supplying air drawn from the apartment heated, and means for varying the proportion of air drawn from the different sources.

2. In a heating system, a steam radiator, a low pressure escape conduit, a valve controlling communication between the radiator and the conduit, and thermostatic actuating means for the valve including an expanding member, a chamber in proximity to said expanding member and in communication with the escape conduit, and provided with passages admitting air to the chamber from the external atmosphere and from a source of air heated by the radiator, and means for simultaneously throttling or cutting off one of said passages and opening the other.

3. A radiator outlet valve mechanism, including in combination a valve casing having an inlet chamber adapted to be connected to the radiator and an outlet chamber adapted to be connected to an escape pipe, said chambers being in communication by a port opening upward into said outlet chamber, a valve for said port located in said outlet chamber, and a thermally expansible member also located in said outlet chamber which when expanded holds said valve against its seat, said valve casing being provided with an opening in the wall of said inlet chamber beneath said port and a removable cover for the opening.

4. A radiator outlet valve mechanism, including in combination a valve casing having an inlet chamber adapted to be connected to the radiator and an outlet chamber adapted to be connected to an escape pipe, said chambers being in communication by a port opening upward into said outlet chamber, a valve for said port located in said outlet chamber, and a thermally expansible member also located in said outlet chamber which when expanded holds said valve against its seat, said valve casing being provided with an opening in the wall of said inlet chamber beneath said port, a removable cover for the opening, and a perforated screen supported by said cover and removable when said cover is removed and arranged to prevent the passage of large particles of dirt into said port from the radiator.

5. A steam radiator outlet valve comprising a casing having an inlet chamber and an outlet chamber, said chambers being in communication through a port opening upward into said outlet chamber, a valve for controlling said port, a hollow thermally expansible member for actuating said valve, both valve and member being located in said outlet chamber, said hollow member being arranged relative to said port so that steam passing through said port will enter said hollow member.

6. A steam radiator outlet valve comprising a casing having an inlet chamber and an outlet chamber, said chambers being in communication through a port opening upward into said outlet chamber, a valve for controlling said port, a hollow thermally expansible member for actuating said valve, both valve and member being located in said outer chamber, and means for directing steam passing through said port into said hollow member, said means including an extension of the hollow member which surrounds and extends below the upper end of said port.

7. A steam radiator outlet valve comprising a casing having an inlet chamber and an outlet chamber, said chambers being in communication through a port opening upward into said outlet chamber, a valve in the outlet chamber for controlling said port, a hollow thermally expansible member for actuating said valve, means for directing steam passing through said port into said hollow member, and means for providing a water seal extending around said port between the lower end of the hollow member and the casing.

8. In combination a steam radiator, an outlet valve casing therefor having an inlet chamber in communication with the radiator and an outlet chamber and a low pressure escape conduit in communication with said outlet chamber, said valve casing having its inlet and outlet chambers connected by a port, a valve for closing said port, and a thermally expansible member for controlling said valve located in said outlet chamber, said member having a passage in it open at one end to receive steam issuing through said port when the valve is open, and at the other end to permit the escape of the steam into the outlet chamber, and said outlet chamber having a port through which air for cooling the expanding member may pass into the outlet chamber.

9. In combination a steam radiator, an outlet valve casing therefor having an inlet chamber in communication with the radiator, an outlet chamber, and a low pressure escape conduit in communication with said outlet chamber, said valve casing having its inlet and outlet chambers connected by a port, a ball valve for closing said port, and a thermally expansible hollow member for controlling said valve located in said outlet chamber, said member having a shell at its lower end for guiding said ball valve and for guiding the steam issuing through the port when the valve is open into the interior of said hollow member, said member also having an opening at its upper end to permit the escape of steam into the outlet chamber, and said outlet chamber having a port through which air for cooling the expansible member may pass into the outlet chamber.

10. In combination a steam radiator, an outlet valve casing therefor having an inlet chamber in communication with the radiator and an outlet chamber, a low pressure escape conduit in communication with said outlet chamber, said valve casing having its inlet and outlet chambers connected by a port opening upward into the outlet chamber, a valve located in the outlet chamber and tending at all times to close said port, and a thermally expansible member located in said outlet chamber and disconnected from said valve but adapted to engage said valve under predetermined temperature conditions and press the valve against its seat, whereby the valve normally serves as a part of the thermostatic controlling mechanism and independently thereof serves as a nonreturn valve to prevent back flow through said port from the outlet chamber of the valve casing to the inlet chamber of the valve casing.

11. In combination a heat radiating device, a low pressure escape conduit and mechanism controlling the flow of the heating fluid through said device, including a valve casing having an inlet side connected to the heating device and an outlet side connected to the escape conduit, a valve controlling communication between said inlet and outlet sides, a tubular member having one end connected to said casing, a chambered end member connected to the other end of said tubular member, a hollow rod of a material having a relatively high coefficient of expansion, located within said tubular member and having one end extending into the valve casing and connected to said valve and the other extending into the chamber in said end member, a shell surrounding said hollow rod within said tubular member and separated therefrom by a space extending between the chamber in said end member and the outlet side of said valve casing, said end member being open to a source of a fluid thermal agent normally exceeding that of the pressure in the outlet side of said valve casing.

12. In combination a heat radiating device, a low pressure escape conduit and mechanism controlling the flow of the heating fluid through said device, including a valve casing having an inlet side connected to the heating device and an outlet side connected to the escape conduit, a valve controlling communication between said inlet and outlet sides, a tubular member having one end connected to said casing, a chambered end member connected to the other end of said tubular member, a hollow rod of a material having a relatively high coefficient of expansion, located within said tubular member and having one end extending into the valve casing and connected to said valve and the other extending into the chamber in said end member, a shell surrounding said hollow rod within said tubular member and separated therefrom by a space and extending between the chamber in said end member and the outlet side of said valve casing, said end member being open to a source of air under pressure normally exceeding that of the pressure in the outlet side of said valve casing, and a non-return valve for preventing flow from said chamber in the end member toward said source, but permitting it in the opposite direction.

13. In combination a steam radiator, a low pressure escape conduit and mechanism controlling the flow of steam through said radiator including a valve having a chamber with an inlet port connected to the radiator and an outlet port connected to the escape conduit, a valve controlling the flow through said chamber from the radiator into the escape conduit, a thermally expansible member connected to and actuating said valve arranged out of the path of water of condensation passing through the chamber, and means for causing a circulation of steam along a considerable extent of said member when steam flows into said chamber from said radiator.

14. In a steam heating system, the combination of a radiator having the usual separate inlet and outlet passages, an escape conduit into which the water of condensation may pass from said outlet passage, a valve controlling the flow of the heating fluid through the radiator and thermostatic mechanism for operating said valve, comprising an expansible mechanism arranged out of the path through which the water of condensation passes from said outlet passage to said escape conduit, and means for causing steam issuing from said outlet passage to flow along a considerable extent of said expansible mechanism.

15. In a steam heating system, the combination of a radiator having the usual separate inlet and outlet passages, an escape conduit into which the water of condensation may pass from said outlet passage, means for impeding the flow of steam from said outlet passage directly into said escape conduit, a valve controlling the passage of the heating fluid through the radiator, and thermostatic actuating mechanism for the valve, including means arranged to form a bypass about said impeding means through which steam escaping from the outlet passage of the radiator passes and heats the thermostatic mechanism.

16. In a steam heating system, the combination of a radiator having the usual separate inlet and outlet passages, an escape conduit into which the water of condensation may pass from said outlet passage, means for providing a water seal in the path of water of condensation from the outlet passage of the radiator to said escape conduit, a valve controlling the flow of the heating fluid through the radiator, and thermostatic actuating mechanism for the valve, comprising expansible mechanism, and means arranged to form a bypass about said water seal through which steam issuing from the outlet passage of the radiator flows along said expansible mechanism.

17. In a steam heating system, the combination of a radiator having the usual separate inlet and outlet passages, an escape conduit into which the water of condensation may pass from said outlet passage, means for impeding the flow of steam from said outlet passage directly into said escape conduit, a valve controlling the passage of the heating fluid through the radiator, and thermostatic actuating mechanism for the valve, including means arranged to form a bypass about said impeding means through which steam escaping from the outlet passage of the radiator passes and heats the thermostatic mechanism, and means for introducing air into said bypass.

18. In a steam heating system, the combination of a radiator having the usual separate inlet and outlet passages, an escape conduit into which the water of condensation may pass from said outlet passage, means for impeding the flow of steam from said outlet passage directly into said escape conduit, a valve controlling the passage of the heating fluid through the radiator, and thermostatic actuating mechanism for the valve, including means arranged to form a bypass about said impeding means through which steam escaping from the outlet passage of the radiator passes and heats the thermostatic mechanism and means for introducing air of regulated temperature into said bypass.

19. In a steam heating system, the combination of a radiator having the usual separate inlet and outlet passages, an escape conduit in which a low pressure is maintained into which the water of condensation may pass from said outlet passage, means for impeding the flow of steam from said outlet passage directly into said escape conduit, a valve controlling the passage of the heating fluid through the radiator, and thermostatic actuating mechanism for the valve, including means arranged to form a bypass about said impeding means through which steam escaping from the outlet passage of the radiator passes and heats the thermostatic mechanism.

HARRY C. MALLORY.

Witnesses:
W M. O. SHIPMAN,
EDWARD J. HESTER.